(12) United States Patent
Kawai

(10) Patent No.: US 7,841,817 B2
(45) Date of Patent: Nov. 30, 2010

(54) PIN AND BUSH FASTENER WITH HIGH FASTENING STRENGTH, AND AIRBAG ATTACHED TO VEHICLE BODY BY SUCH A FASTENER

(75) Inventor: Yasuhiro Kawai, Toyohashi (JP)

(73) Assignee: Newfrey LLC, Newark, DE (US)

( * ) Notice: Subject to any disclaimer, the term of this patent is extended or adjusted under 35 U.S.C. 154(b) by 597 days.

(21) Appl. No.: 11/776,276

(22) Filed: Jul. 11, 2007

(65) Prior Publication Data

US 2008/0014045 A1    Jan. 17, 2008

(51) Int. Cl.
*F16B 13/06*    (2006.01)

(52) U.S. Cl. .......................................... 411/45; 411/41

(58) Field of Classification Search .................. 411/41, 411/45–48

See application file for complete search history.

(56) References Cited

U.S. PATENT DOCUMENTS

| | | | | |
|---|---|---|---|---|
| 2,657,894 A | * | 11/1953 | Sklenar ...................... 248/239 |
| 6,511,108 B1 | * | 1/2003 | Roessner et al. ............ 292/320 |
| 6,616,479 B1 | * | 9/2003 | Jones ......................... 439/567 |
| 6,910,840 B2 | * | 6/2005 | Anscher ....................... 411/41 |
| 6,932,552 B2 | * | 8/2005 | Anscher et al. ............... 411/41 |
| 7,188,393 B2 | * | 3/2007 | Kawai .......................... 24/297 |
| 7,374,200 B2 | * | 5/2008 | Ikeda et al. .............. 280/728.2 |
| 7,690,876 B2 | * | 4/2010 | Kawai et al. ................... 411/45 |
| 2004/0247410 A1 | | 12/2004 | Anscher et al. |
| 2005/0062263 A1 | | 3/2005 | Kawai et al. |
| 2007/0003390 A1 | * | 1/2007 | Kawai .......................... 411/48 |

FOREIGN PATENT DOCUMENTS

| JP | 1-85509 U | 6/1989 |
|---|---|---|
| JP | 5-50130 U | 7/1993 |
| JP | 2000240624 | 9/2000 |

* cited by examiner

*Primary Examiner*—Flemming Saether
(74) *Attorney, Agent, or Firm*—Michael P. Leary

(57) ABSTRACT

A fastener comprising a bush and a pin is used to mount an airbag on a vehicle body panel. The pin has a head with legs depending therefrom, and the bush has a flange with a shank depending therefrom. The shank supports resilient pawls moveable in slots. The legs of the pin are inserted into the slots to a temporary connection position at which the resilient pawls are free to move inward of the slots, and to a permanent connection position at which such movement is blocked. The bush shank has a rigid axial column between the slots. The flange has a pair of spaced upright walls defining a space for receiving the pin and for preventing the head of the pin from being pressed inadvertently.

9 Claims, 14 Drawing Sheets

PIN AND BUSH FASTENER WITH HIGH FASTENING STRENGTH, AND AIRBAG ATTACHED TO VEHICLE BODY BY SUCH A FASTENER

CROSS-REFERENCE TO RELATED APPLICATIONS

This application claims the benefit of Patent Application No. 2006-193166 filed Jul. 13, 2006 incorporated herein by reference.

This application discloses and claims subject matter related to that disclosed and claimed in application Ser. No. 11/422,420 filed Jun. 6, 2006, also incorporated herein by reference.

BACKGROUND OF THE INVENTION

Application Ser. No. 11/422,420 referred to above, discloses and claims a pin and grommet fastener with high fastening strength, used in attaching an airbag to a vehicle body. The present invention is a further development of the invention of that application.

Pin and bush (grommet) fasteners for joining panels and/or for mounting various types of members on panels are well known. See, for example, Japanese Utility Model Laid-Open Publication No. 05-050130; Unexamined Japanese Utility Model Application Publication No. 1-85509; United States Patent Application Publication No. US 2005/0062263; Japanese Patent Laid-Open Publication No. 2000-240624; U.S. Pat. No. 6,910,840; and U.S. Pat. No. 6,932,552. For certain applications, for example attaching a curtain shield airbag to a body panel of a vehicle, it is desirable that such fasteners be strong enough to resist detachment forces in both vertical and horizontal directions with respect to workpieces.

The invention disclosed and claimed in U.S. application Ser. No. 11/422,420 provides an improved pin and bush (grommet) fastener that can be fastened to workpieces, such as panels, with high enough fastening strength to resist both vertical and horizontal detachment forces. The invention provides a fastener (clip) that can provide high fastening strength to a thin panel and that effectively prevents deformation of the thin panel. More particularly, the invention can provide secure attachment of a curtain shield airbag to a body panel of a vehicle.

In a preferred embodiment of the invention disclosed and claimed in U.S. application Ser. No. 11/422,420, a fastener comprises a pin having a head and a plurality of legs depending from the head, and a grommet having a flange and a shank depending from the flange. In use, the pin is pushed into the grommet. The shank of the grommet has longitudinal slots for receiving respective legs of the pin when the pin is pushed into the grommet, and has resilient pawls for engaging corresponding edge regions of a mounting hole in a workpiece (e.g., a car body panel) when the grommet shank is inserted into the mounting hole. The grommet shank has a strong central axial column, the cross-section of which occupies most of the cross-section of the grommet shank. When the pin is fully inserted into the grommet shank, legs of the pin engage the axial column of the grommet and also engage respective resilient pawls of the grommet to prevent the pawls from moving inwardly of the grommet shank. The legs also fill out portions of the grommet shank cross-section not occupied by the axial column. When the grommet shank has a polygonal cross-section profile, for example, and is inserted into a polygonal profile hole, the cross-section of the grommet shank matches the profile of the hole. By virtue of the invention, high fastening strength is achieved that strongly resists axial and transverse detachment forces applied to the fastener.

In accordance with the invention described and claimed in application Ser. No. 11/422,420, the pin can be pushed into the grommet to a temporary connection position, at which the legs of the pin do not impede inward movement of the pawls with respect to the shank of the grommet, and can be pushed in farther to a permanent connection position, at which the legs block inward movement of the pawls.

As further described and claimed in application Ser. No. 11/422,420, such fasteners are used in an assembly that includes an attachment member for an airbag and that mounts the airbag on a body panel of a vehicle.

BRIEF DESCRIPTION OF THE INVENTION

The present invention is a further development of the invention disclosed and claimed in application Ser. No. 11/422,420. More particularly, in one embodiment of the present invention, the legs of the pin are resilient so that when they are inserted into corresponding slots of the bush (grommet) shank, they flex resiliently. Cooperable parts of the legs and the bush hold the pin at a temporary connection position and at a permanent connection position. When the pin is at the temporary connection position it is connected to the bush initially after being pushed partially into the bush. In that position, cooperable parts resist separation of the pin from the bush, and in that position resilient pawls on the bush shank are free to move inwardly of the bush shank. When the pin is at the permanent connection position, after being pushed fully into the bush, cooperable parts resist separation of the pin from the bush, and at that position movement of the resilient pawls inwardly of the bush shank is blocked by the pin legs.

In an embodiment of the present invention, the flange of the bush has a pair of spaced walls that extend upright from the flange in a direction opposite to the bush shank and that provide protection against inadvertent pressing on the head of the pin.

In an embodiment of the present invention, a stiff axial column of the bush shank has a portion with a cruciform cross-section, with slots at corners of the cross-section for receiving respective legs of the pin.

In an embodiment of the present invention, legs of a pin have notches that cooperate with resilient pawls on the bush shank for holding the pin in the temporary connection position and in the permanent connection position.

In an embodiment of the invention, fasteners according to the invention are used in an assembly to mount an airbag on a body panel of a vehicle. The assembly includes an airbag attachment member, and may include a spacer between the attachment member and the body panel.

BRIEF DESCRIPTION OF THE DRAWINGS

The invention will be further described in conjunction with the accompanying drawings illustrating preferred (best mode) embodiments, and wherein.

DETAILED DESCRIPTION OF THE INVENTION

FIGS. 1-4 show a fastener 1 of the invention, comprising a pin 6 and a bush 7, the pin being shown at a temporary connection position. These figures will be referred to in greater detail later.

Figure 5:
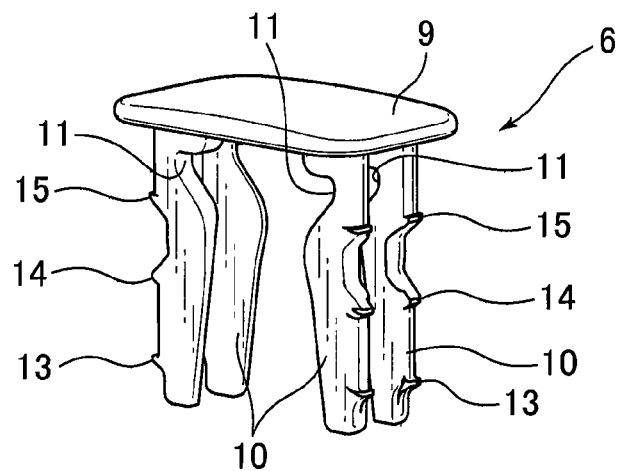
FIG. 5 is a perspective view of a pin of the fastener in FIG. 1.
Figure 6:
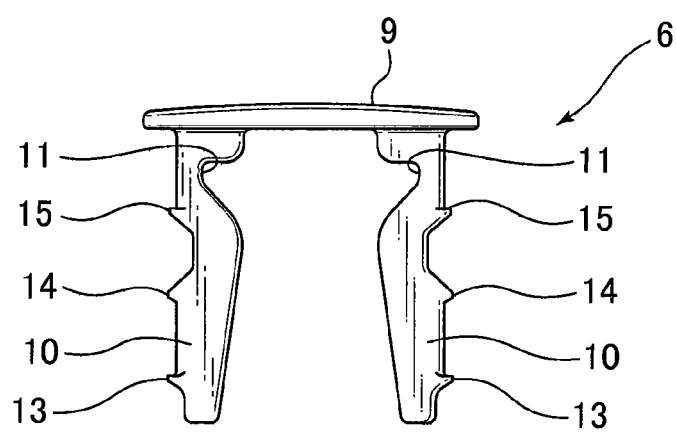
FIG. 6 is a front view of the pin in FIG. 5.
Figure 7:
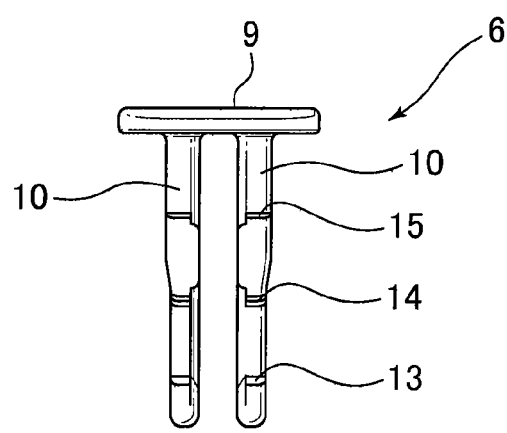
FIG. 7 is a right side view of the pin in FIG. 5.
Figure 8:
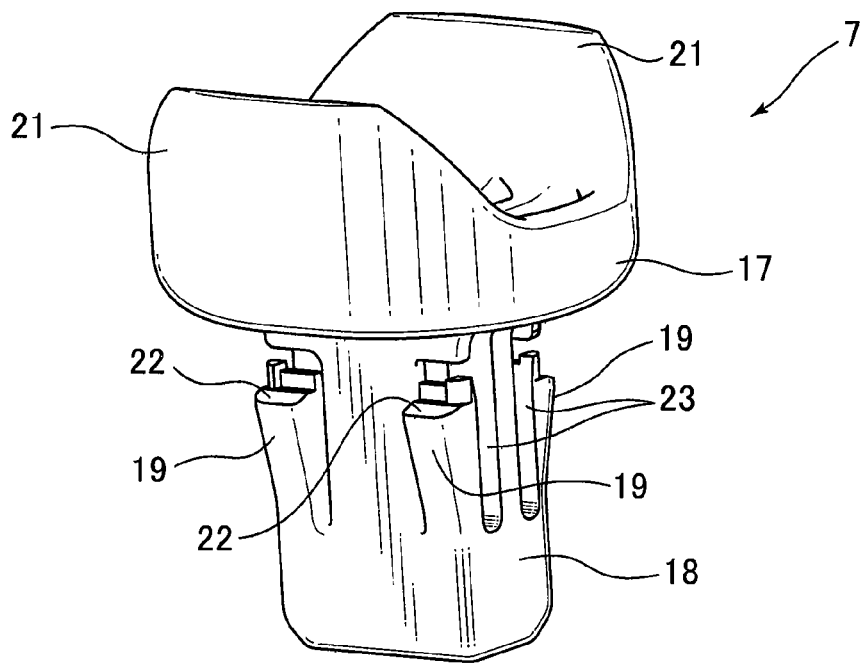
FIG. 8 is a perspective view of a bush of the fastener in FIG. 1.
Figure 9:
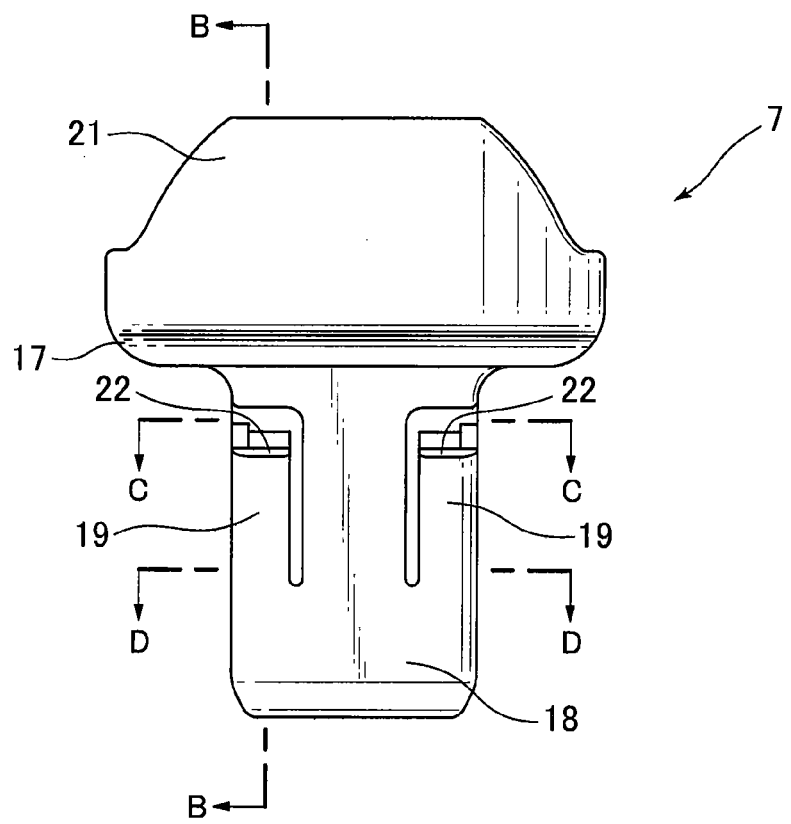
FIG. 9 is a front view of the bush in FIG. 8.
Figure 10:
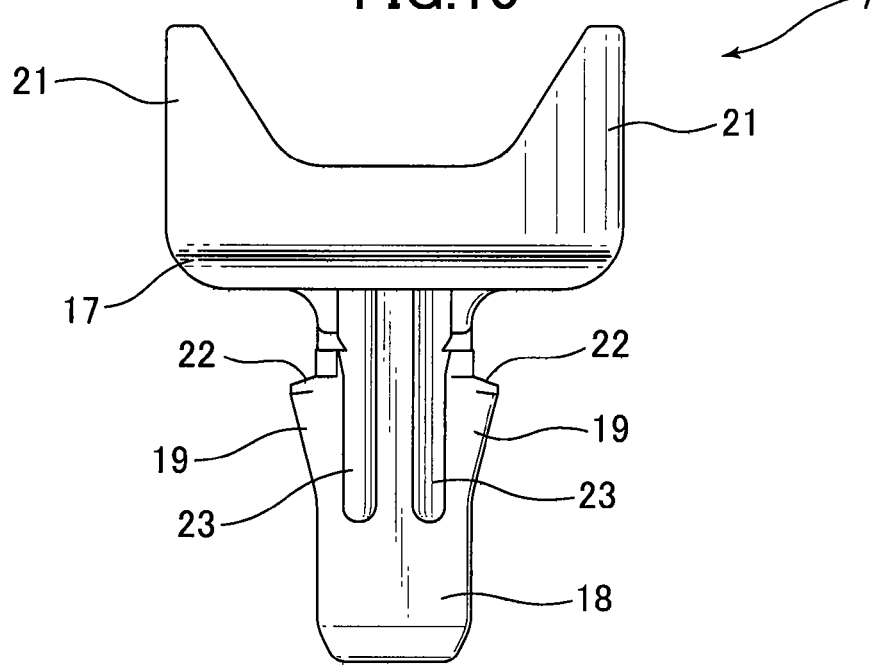
FIG. 10 is a right side view of the bush in FIG. 8.

FIGS. 5-7 show a first embodiment of the pin 6. As shown, the pin has a head 9 (generally flat and rectangular in the embodiment, but not necessarily so) and four legs 10 depending from the head 9 at locations close to the corners of the head. Each leg 13 is resilient, and its resilience is assisted by the provision of a recess 11 that reduces the cross-section of the leg near the head 9. Each leg has a plurality of outwardly-facing protrusions 13, 14, and 15. The protrusions are parts that engage cooperable parts of the bush, as later described.

Figure 11:
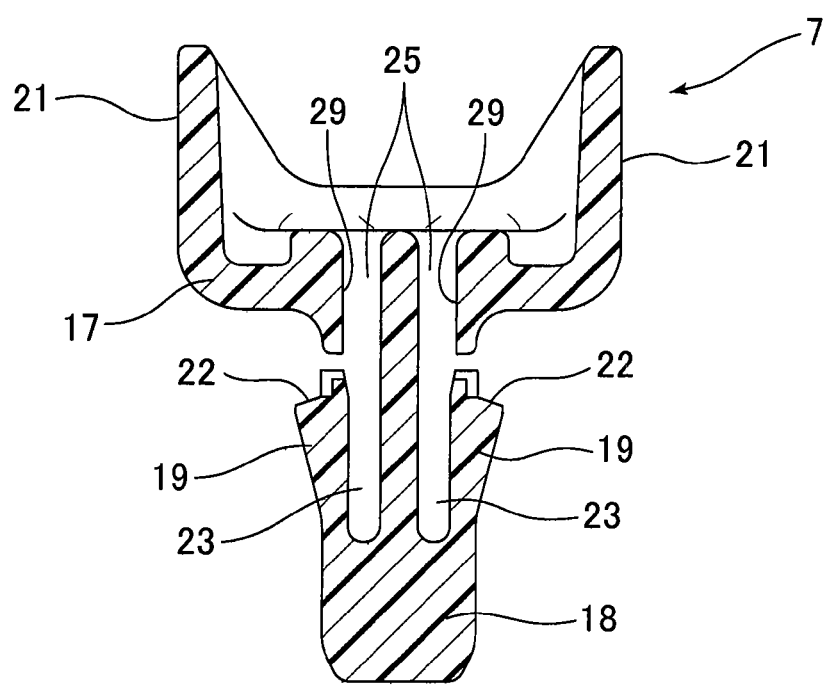
FIG. 11 is a sectional view of the bush, taken along the line B-B in FIG. 9.
Figure 12:
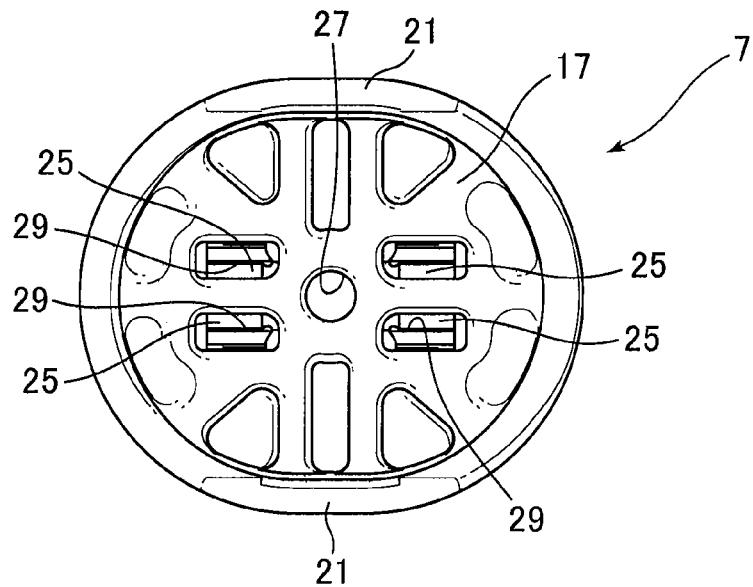
FIG. 12 is a top plan view of the bush in FIG. 8.

One embodiment of the bush 7 in accordance with the invention is shown in FIGS. 8-14. As shown, the bush has a flange 17 with a shank 18 depending from the flange. FIG. 12 shows the generally elliptical or oval contour of the flange 17 in the embodiment, but this shape can vary. In the embodiment, the bush shank has a polygonal cross-section, more particularly a generally rectangular cross-section, but the shape can vary. Four resilient pawls 19 are provided at corner regions of the bush shank. Each pawl is hinged on the shank at a lower end intermediate the length of the shank. An upper end of each pawl, adjacent to the flange 17 has a shoulder 22.

Each pawl has a rest position at which the pawl projects outwardly from the shank, and each pawl is adapted to move inwardly of the shank into a corresponding longitudinal slot 23 that extends from an opening 25 in the flange 17, as shown in FIGS. 11 and 12.

The flange 17 has a pair of spaced upright walls 21, the purpose of which will become apparent later. As later described, portions 29 of the bush cooperate with the protrusions of the legs described earlier.

Figure 4:
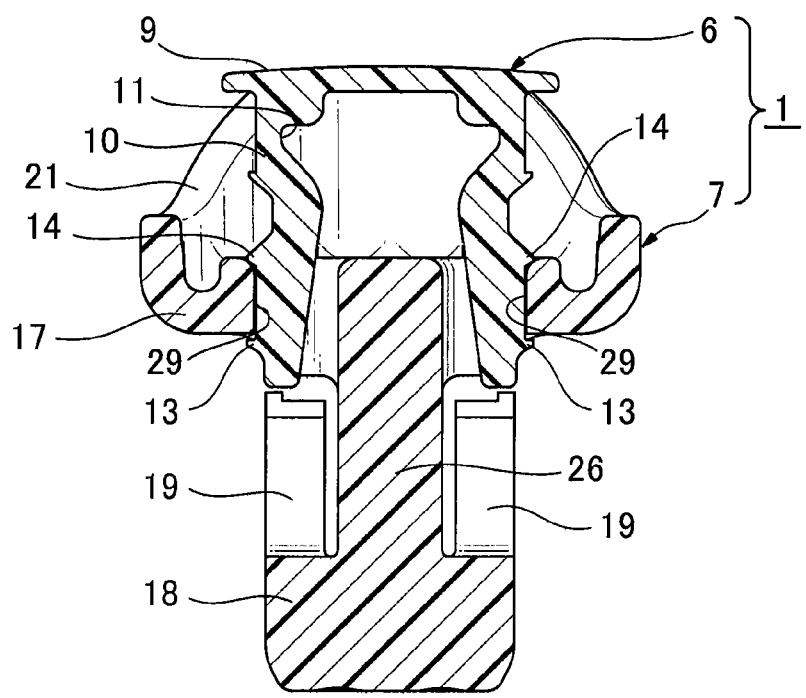
FIG. 4 is a sectional view of the fastener, taken along the line A-A in FIG. 3.
Figure 13:
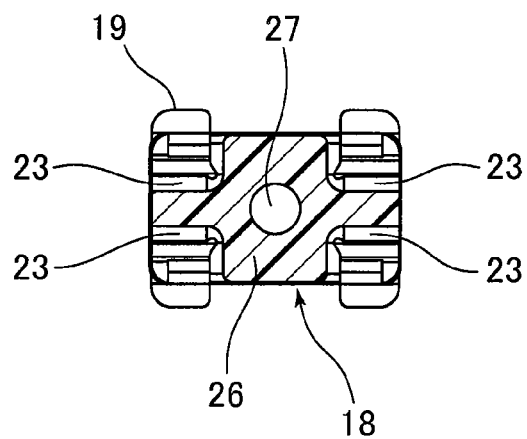
FIG. 13 is a sectional view of the bush, taken along the line C-C in FIG. 9.
Figure 14:
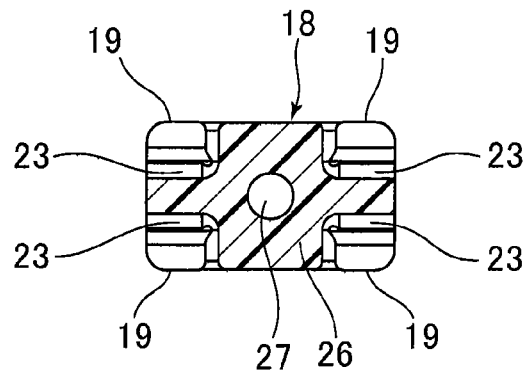
FIG. 14 is a sectional view of the bush, taken along the line D-D in FIG. 9.

As shown in FIGS. 4, 13, and 14, the bush 7 has a strong, rigid axial column 26 extending toward the flange 7 from a tip end region of the bush. As shown in FIGS. 12-14, the axial column 26 may have a central bore 27, which reduces the amount of material of the column without significantly detracting from its rigidity and strength.

As shown in FIGS. 13 and 14, the cross-section of the axial column 26 has a cruciform shape in the portion of the bush shank where the longitudinal slots 23 are formed. Slots 23 are arranged in left and right pairs embracing arms of the cruciform shape and adapted to receive corresponding pairs of the resilient pawls 19. When the pawls 19 fully occupy the slots 23, the axial column 26 and the pawls 19 occupy substantially the entirety of the cross-section of the shank 18 of the bush.

Referring again to FIGS. 1-4, these figures show the pin 6 at a temporary connection position, where the pin and the bush are connected temporarily prior to a later permanent connection position of the pin relative to the bush. An advantage of the temporary connection position is that the pin and the bush can be handled as a unit, reducing the possibility of losing one of these two components of the fastener. To arrive at the temporary connection position, tips of the legs 10 of the pin are aligned with corresponding openings 25 in the flange 17 of the bush, and pressure is applied to the head 9 of the pin to move the legs of the pin partially into the corresponding slots 23.

At the temporary connection position, protrusions 13 and 14 engage cooperable edge regions of corresponding openings 25 in the flange 17 of the bush, as shown in FIG. 4, to maintain the pin at the temporary connection position. At this position, by virtue of the protrusions 13 the pin cannot be easily ejected from the bush, and by virtue of the protrusions 14 the pin cannot be easily pressed farther into the bush, inadvertently. The legs 10 are splayed outwardly slightly at their rest position shown in FIGS. 5 and 6 and are flexed resiliently toward the longitudinal axis of the bush as the legs enter the corresponding slots 23, to permit the legs to reach the temporary connection position. At the temporary connection position, the legs 10 of the pin do not extend far enough into the slots 23 to block inward movement of the resilient pawls 19.

Figure 1:
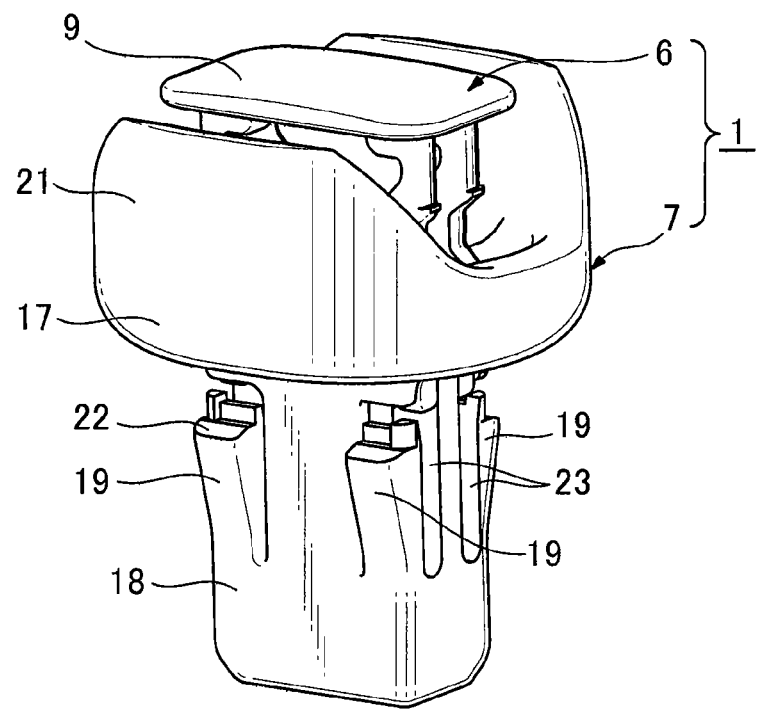
FIG. 1 is a perspective view of a fastener according to a first embodiment of the present invention, with the pin set at a temporary connection position.
Figure 2:
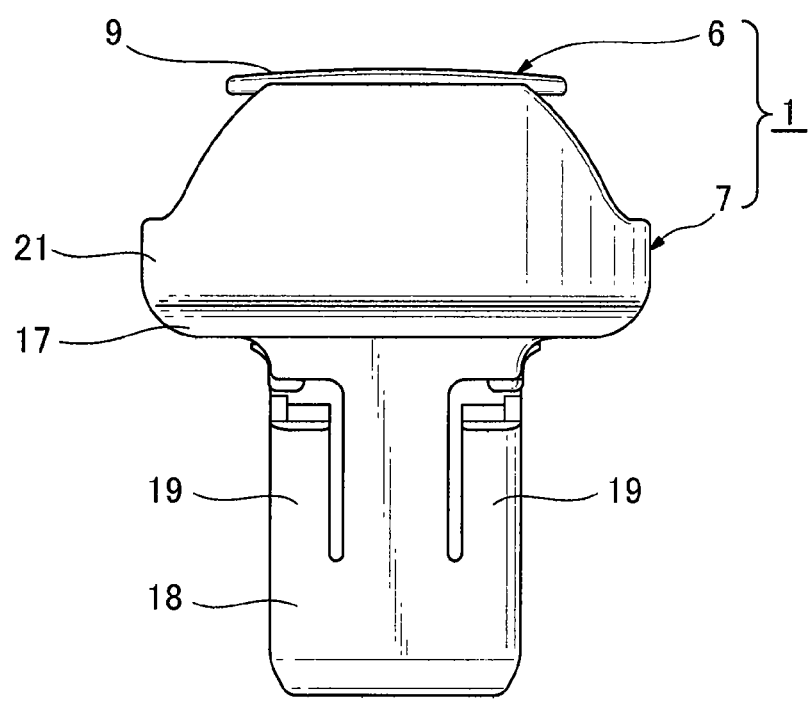
FIG. 2 is a front view of the fastener in FIG. 1.
Figure 3:
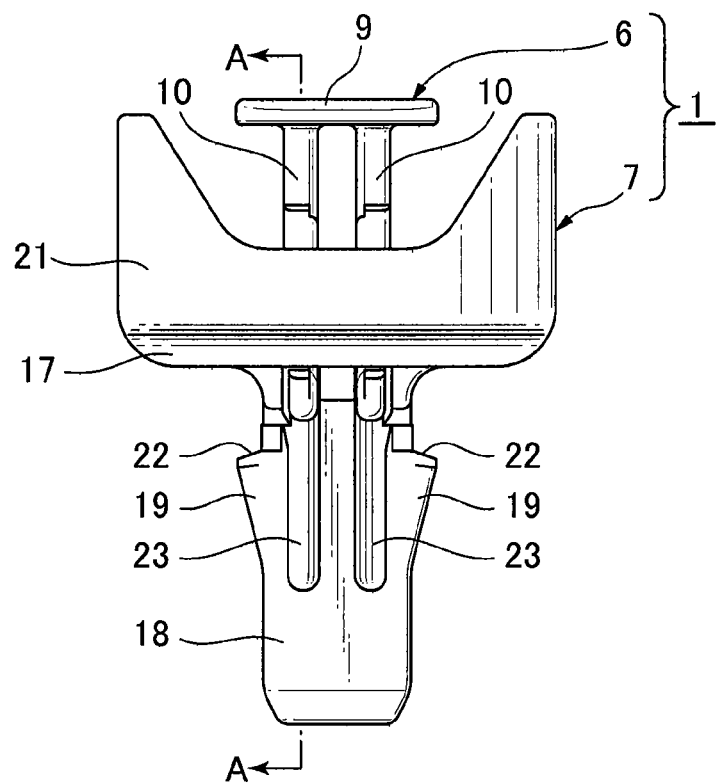
FIG. 3 is a right side view of the fastener in FIG. 1.
Figure 15:
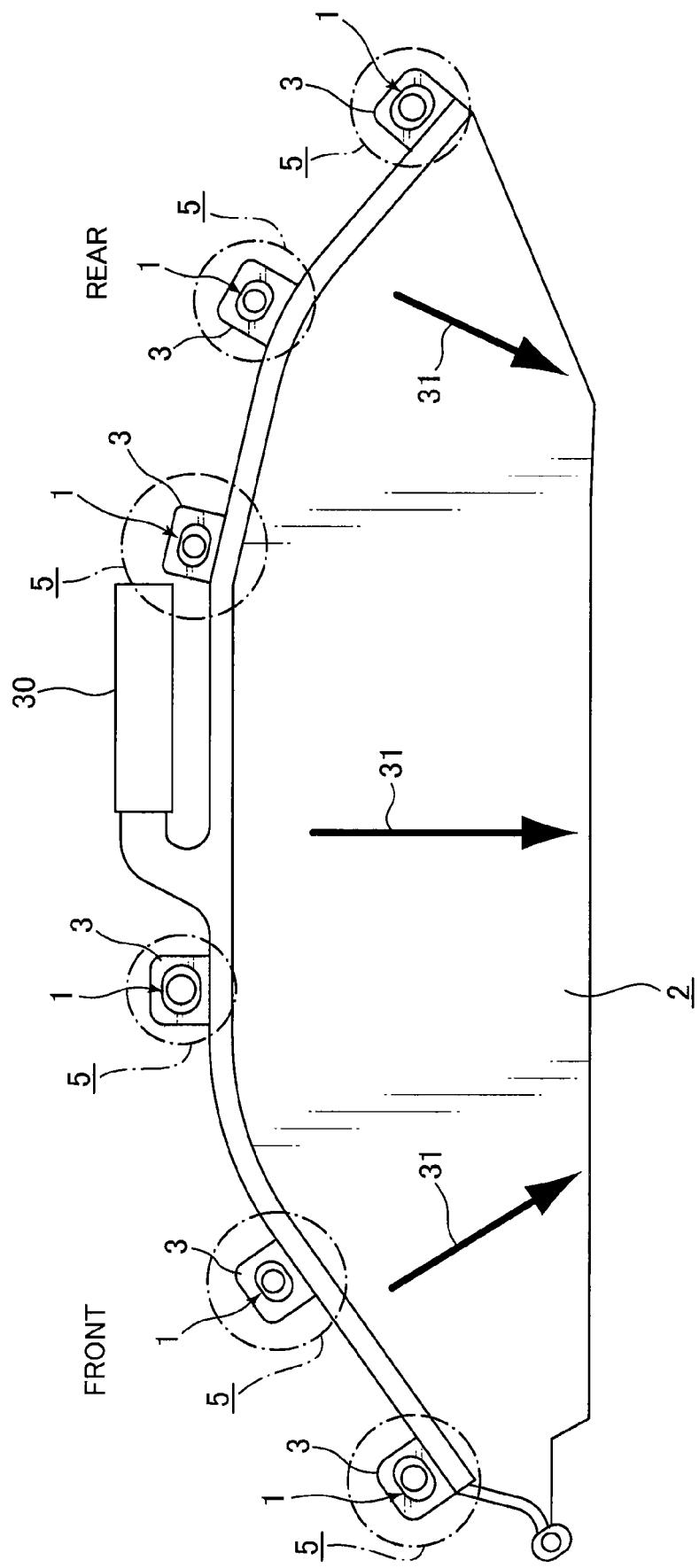
FIG. 15 is an explanatory view of an operation of mounting a curtain shield airbag to a vehicle body panel.

Also, at the temporary connection position, the head 9 of the pin 6 is just about at the level of the upper ends of the walls 21 on the flange to protect the pin against forces applied to the pin head inadvertently. Walls 21 also contribute significantly to the strength of the flange 17, which increases fixing strength of the fastener 1 to workpieces. This makes it possible to prevent breakage of the flange 17 even if a strong force is applied thereto, as may occur during instantaneous inflation of a curtain shield airbag. As shown in FIGS. 1 and 3, the walls 21 are shaped to provide recesses at opposite ends of the rectangular pin head 9 to facilitate engagement of the pin head with a user's finger, when pressure on the pin head is desired As stated earlier, one application of fasteners in accordance with the invention is the mounting of a curtain shield airbag on a vehicle body panel. FIG. 15 shows, somewhat diagrammatically, a curtain shield airbag 2 mounted on a vehicle body panel 5 by a series of fasteners 1 of the invention. Arrows 31 indicate that the airbag 2 has been deployed by gas from an inflator 30 in a manner well known. Airbag attachment members are shown by the brackets 3 in FIG. 15. The curtain shield airbag 2 is mounted on the vehicle body panel 5 inside the vehicle along an upper edge of front and rear side windows. In a normal condition, the airbag body is stored at an installation position above the side windows while folded in a compact size.

FIGS. 16-20 show in detail the manner in which each fastener 1 can be used in mounting a curtain shield airbag on a vehicle body panel.

Figure 16:
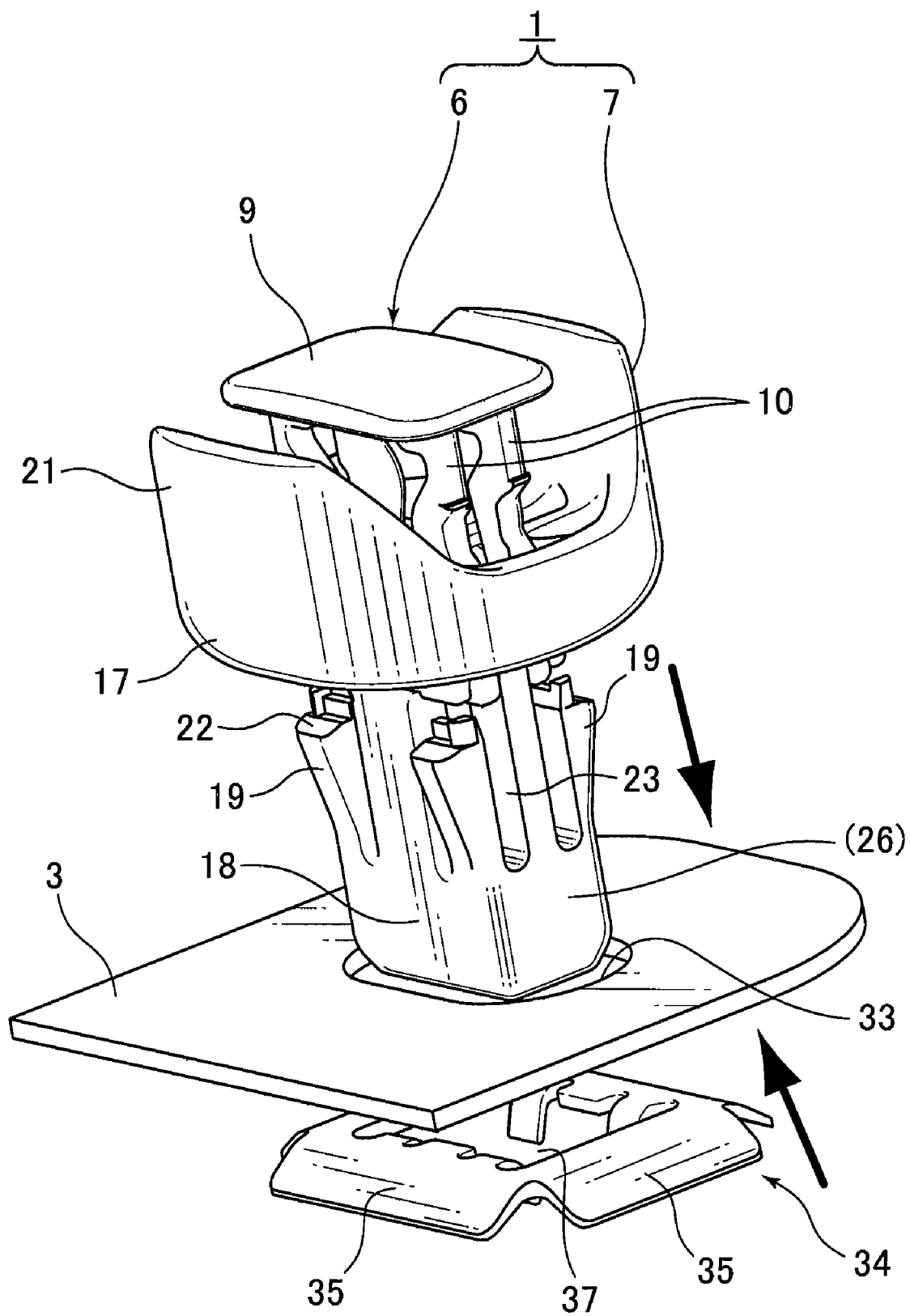
FIG. 16 is a perspective view showing an operation of temporarily fixing the fastener in FIG. 1 to a curtain-shield-airbag bracket and a spacer.

FIG. 16 shows a fastener 1 of the invention with the pin 6 at the temporary connection position relative to the bush 7. In FIG. 16 the tip of the shank 18 of the bush has been aligned with an opening 33 in an airbag attachment member (bracket) 3. The opening has a profile that complements the profile of the bush shank. The attachment member 3 is shown associated with an optional spacer 34 having resilient lips 35 and an opening 37 similar to the opening 33. The spacer 34 can eliminate a wobbling movement between the attachment member 3 and the vehicle body panel 5 to provide a stable mounting state. The thickness of the spacer 34 may be selectively set at an appropriate value to adjust an installation thickness (or height) required for mounting the curtain shield airbag 2 on a vehicle body panel 5. The arrows in FIG. 16 are intended to show prospective movement of the shank 18 of the bush through the holes 33 and 37.

With the pin 6 at the temporary connection position, the shank 18 can be pressed through the holes 33 and 37. The resilient pawls 19 flex inwardly to permit the shank to pass through the openings, and then return to their rest positions, at which the attachment member 3 and the spacer 34 are trapped between the shoulders 22 of the pawls and the flange 17 of the bush. In this state, the assembly shown in FIG. 16 can be carried to a vehicle production line, and the shank 18 of the bush can then be inserted through a hole in the vehicle panel 5, similar to holes 33 and 37, the pawls 19 flexing inwardly of the shank to permit such insertion and then returning to their rest position at which the shoulders 22 engage edge regions of the hole in the body panel. Pre-attachment of fasteners 1 to attachment members 3, with the fasteners at the temporary connection position, avoids the need for fixing the fasteners to the curtain shield airbag brackets at a vehicle assembly line. Pressing the pins to the permanent connection position is a simple task, reducing the time necessary for an assembly operation.

Figure 17:
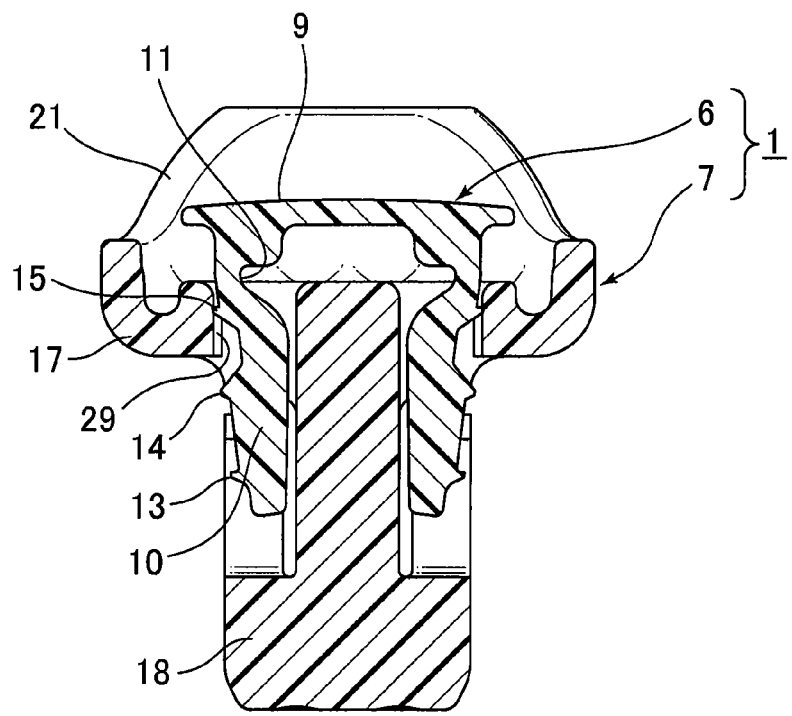
FIG. 17 is a sectional view of the fastener, taken along the line A-A in FIG. 3, during an operation of changing the pin at the temporary connection position to a permanent connection position.
Figure 19:
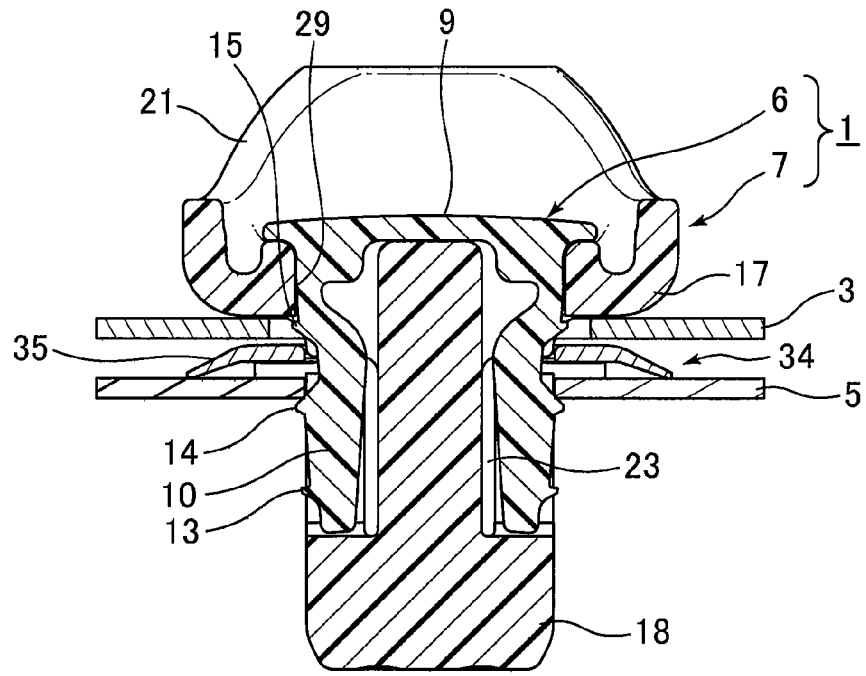
FIG. 19 is a sectional view of the assembly, taken along the line E-E in FIG. 18.
Figure 20:
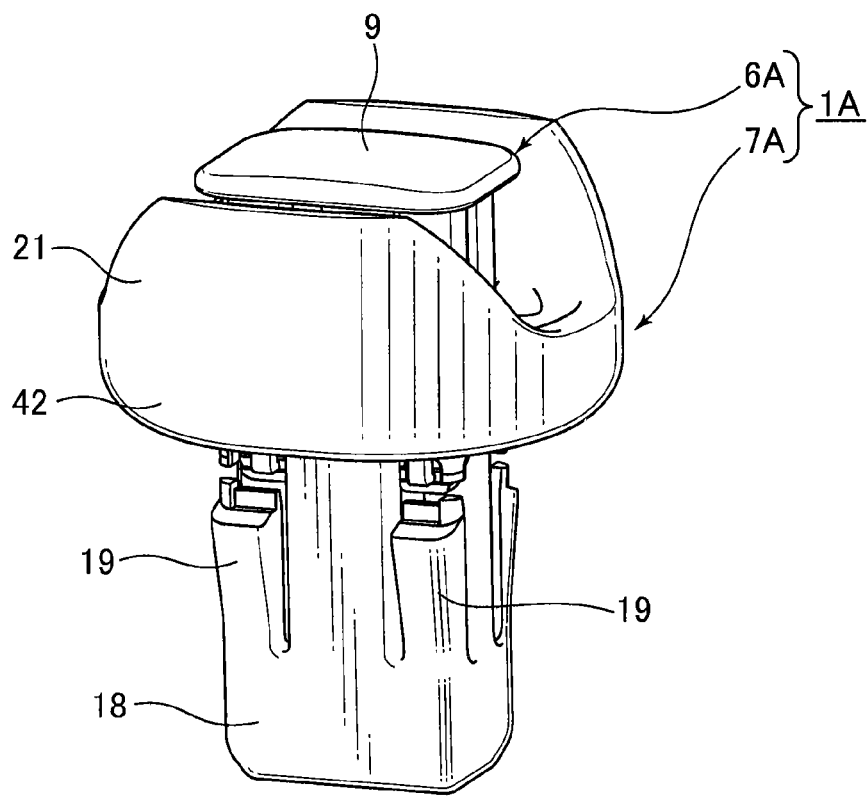
FIG. 20 is a perspective view of a fastener according to a second embodiment of the present invention, with the pin set at a temporary connection position.
Figure 21:
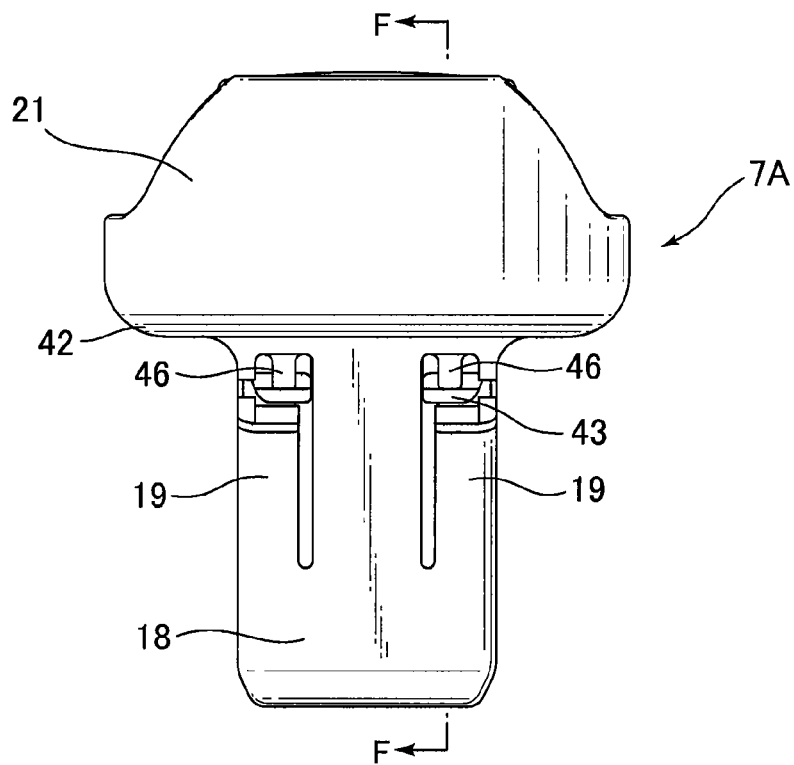
FIG. 21 is a front view of the fastener in FIG. 20.

As shown in FIGS. 17 and 19, from the temporary connection position, the pin 6 can be inserted farther into the bush 7, so that the legs 10 of the pin are fully inserted into the corresponding slots 23. FIG. 17 shows the pin 6 pushed farther into the bush 7 from the temporary connection position on the way to the permanent connection position. At the permanent connection position of the pin relative to the bush, the head 9 of the pin can engage the flange 17 and the axial column of the bush as shown in FIG. 19.

Figure 18:
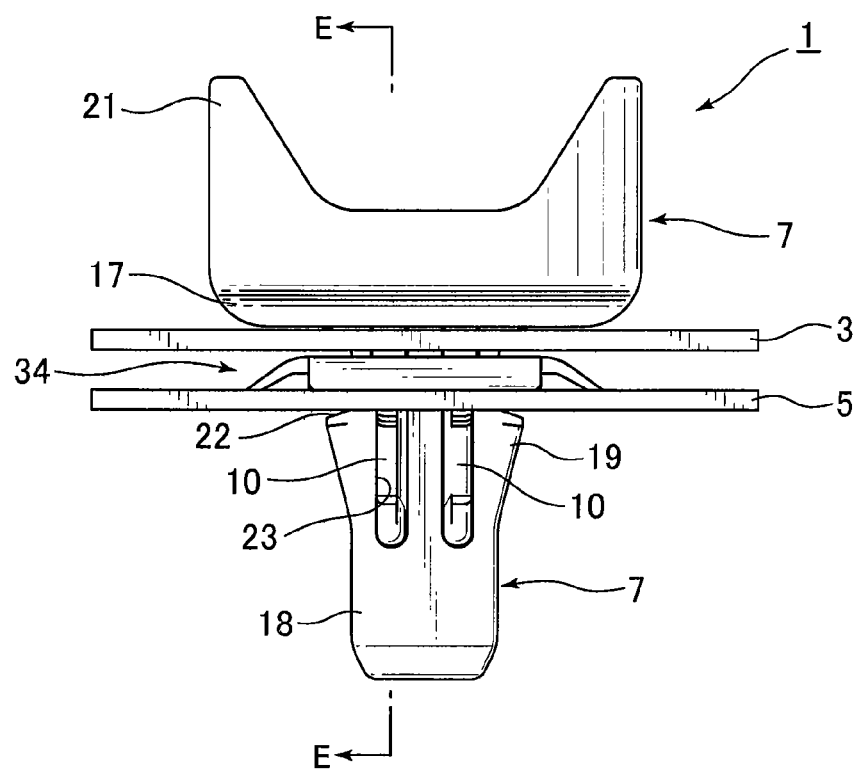
FIG. 18 is a front view showing an assembly in which the fastener in FIG. 1 is used to fasten a curtain-shield-airbag to a body panel and with the pin set at the permanent connection position.

At the permanent connection position, the fastener 1 is securely attached to the airbag attachment member 3 and the vehicle body panel 5. As shown in FIGS. 18 and 19, the attachment member 3, spacer 34, and the body panel 5 are securely clamped between the flange 17 of the bush 7 and the pawls 19 of the bush shank 18. The shoulders 22 engage opposite edge regions of the hole in the body panel. With a polygonal cross-section of the bush shank and a similar profile the hole in the body panel, rotation of the fastener 1 about its longitudinal axis is prevented. Flat sides of the legs 10 block movement of corresponding pawls 19 inwardly of the bush shank, while protrusions 14 of the legs can engage other edge regions of the hole in the body panel for additional secure attachment, as shown in FIG. 19.

Fasteners in accordance with the invention can provide very high attachment strength of an airbag attachment member to a vehicle body panel. The attachment member constitutes one workpiece, and the body panel constitutes another workpiece. The fasteners can also be used to attach other types of workpieces to one another with a strong attachment force. In all applications, detachment forces applied to the fasteners vertically or horizontally (longitudinally or transversely) are strongly resisted.

With a rectangular-shaped mounting hole of a workpiece, it is known that four corners of the mounting hole are resistant to deformation. Therefore, a fastener of the invention having resilient pawls disposed to engage four corner regions of a mounting hole in a workpiece can obtain high fastening force even if the workpiece has relatively low strength.

Although, in the fastener embodiment just described, and in another embodiment to be described hereinafter, it is preferred that the cross-section of the bush shank be generally rectangular and that the holes into which the bush shank is inserted have a complementary generally rectangular profile, other bush shank cross sections and complementary hole profiles may be appropriate. For example, other polygonal bush shank cross-sections and hole profiles may be appropriate, or even a cylindrical bush shank cross-section and a circular mounting hole may be appropriate. In each case, a plurality of resilient pawls, such as four pawls disposed at 90° intervals, may be provided.

FIGS. 20-28 illustrate a second embodiment of the invention. In the second embodiment a fastener 1A comprises a pin 6A and a bush 7A. The general configuration of the bush is similar to that in the first embodiment. However, the flange 42 has a plurality of resilient pawls 46 that extend inwardly into corresponding slots 23 for receiving legs 41 of the pin 6A.

Figure 23:
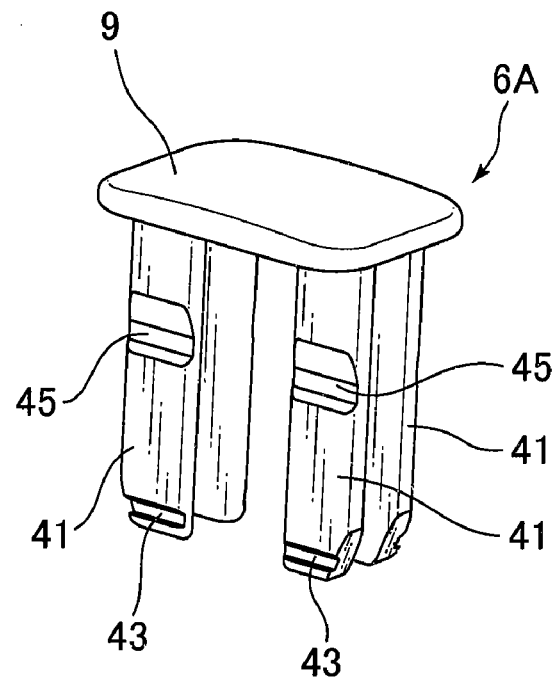
FIG. 23 is a perspective view of a pin of the fastener in FIG. 20.
Figure 24:
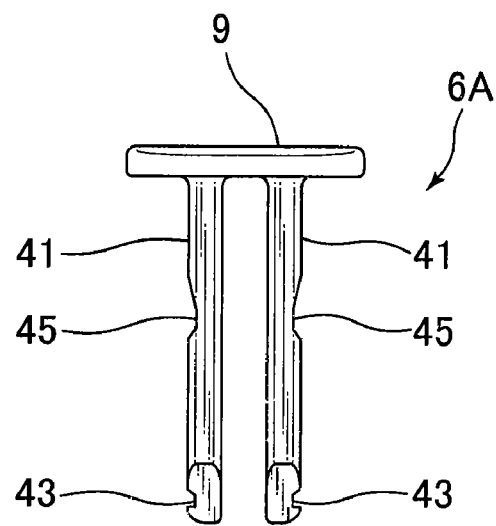
FIG. 24 is a right side view of the pin in FIG. 23.

In the embodiment, the head 9 of the pin is similar to the head 9 of the first embodiment, but the four legs 41 depending from the head are straight and need not be resilient, so that greater leg stiffness is possible. As shown in FIGS. 23 and 24, each leg has a notch 43 near a tip of the leg and a notch 45 intermediate the length of the leg.

Figure 22:
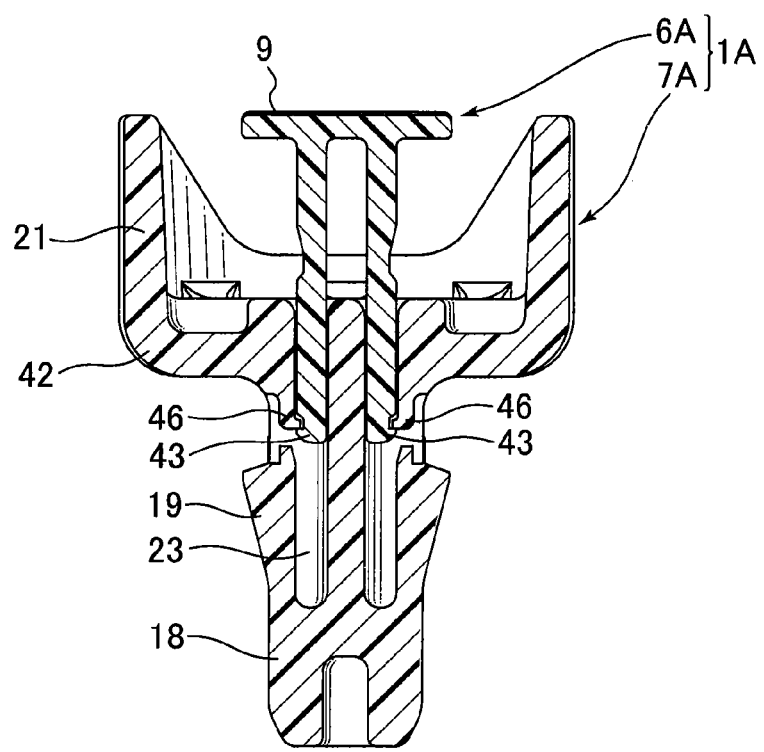
FIG. 22 is a sectional view of the fastener, taken along the line F-F in FIG. 21.

At a temporary connection position shown in FIG. 22, resilient pawls 46 have entered corresponding the notches 43 to maintain the pin at the temporary connection position. As in the first embodiment, at the temporary connection position the resilient pawls 19 are free to flex inwardly of the shank 18 of the bush.

Figure 28:
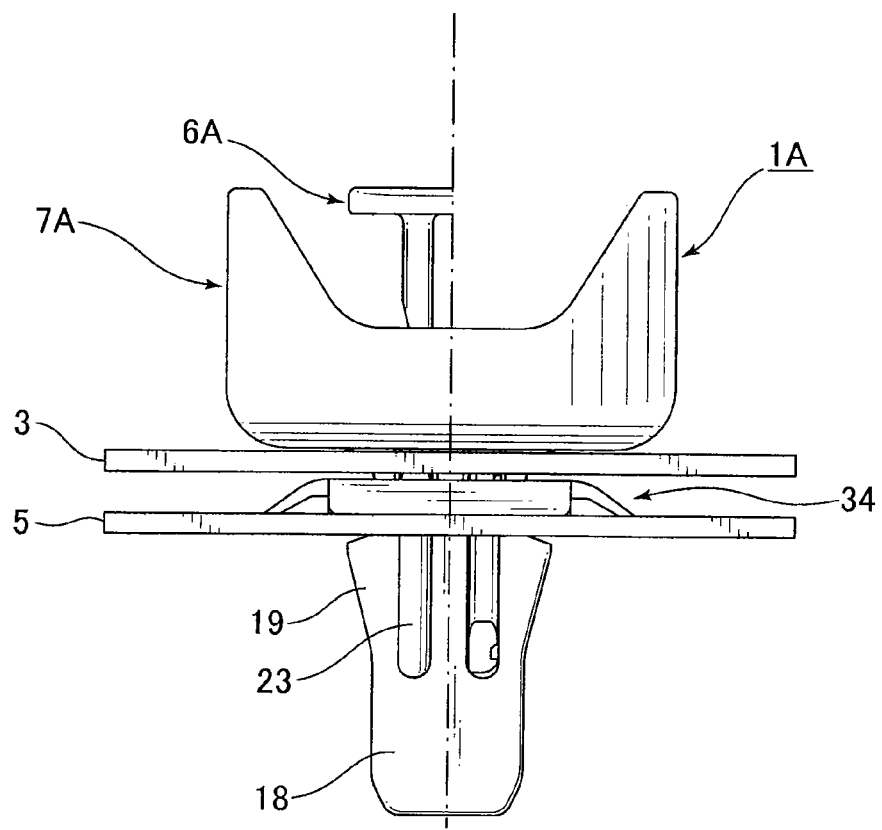
FIG. 28 is a front view showing an assembly similar to FIG. 18, but using the fastener in FIG. 20 with the pin set at the temporary connection position (left half of the Figure) and at the permanent connection position (right half of the Figure).

The left side of FIG. 28 shows an assembly of the pin 6A, the bush 7A, the airbag attachment member 3, the spacer 34, and the vehicle body panel 5, with the pin at the temporary connection position. The right side of FIG. 28 shows the pin fully inserted in the bush to bring the legs of the pin to the permanent connection position, at which inward movement of the resilient pawls 19 is blocked by the legs. At the permanent connection position, the resilient pawls 46 engage notches 45 in the legs 41 to maintain the permanent connection position.

Figure 25:
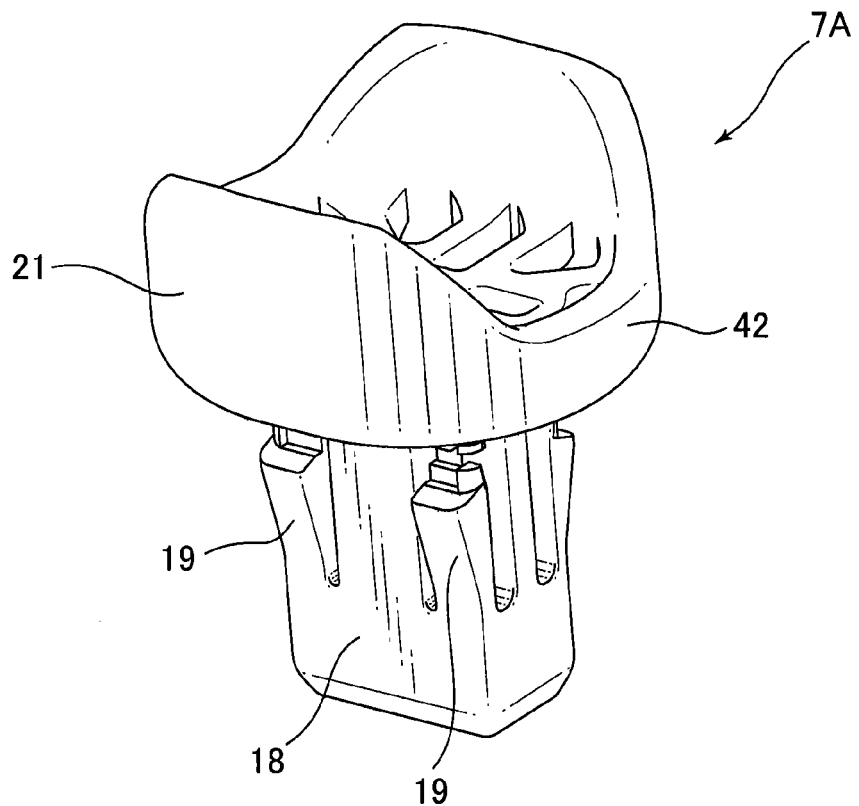
FIG. 25 is a perspective view of a bush of the fastener in FIG. 20.
Figure 26:
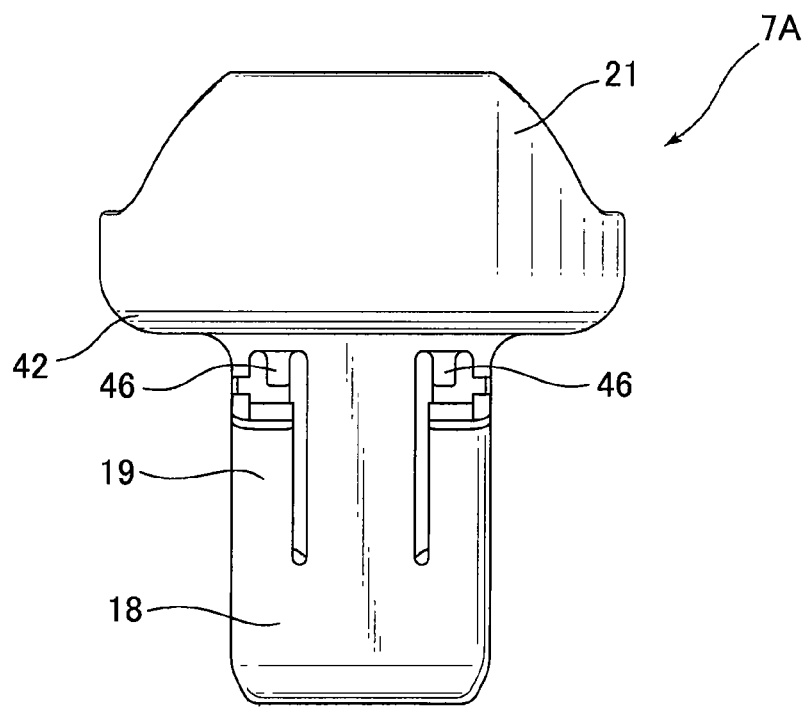
FIG. 26 is a front view of the bush in FIG. 25.
Figure 27:
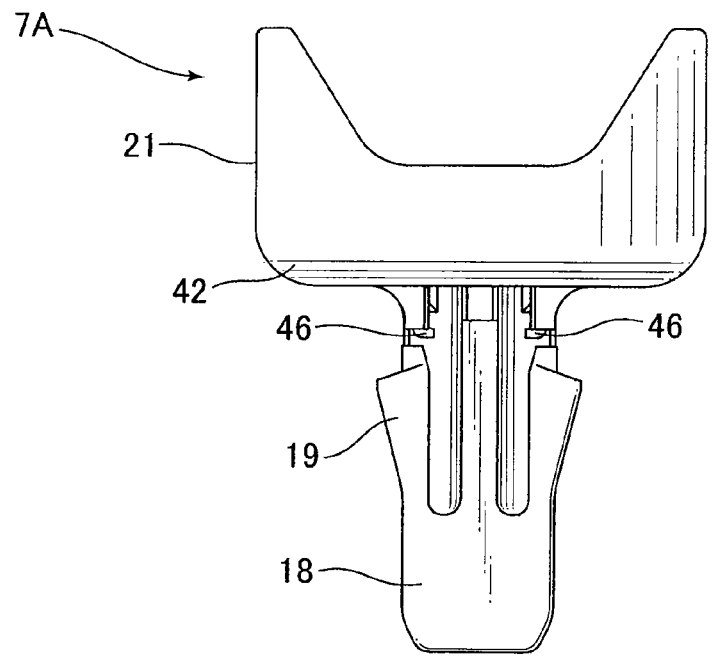
FIG. 27 is a right side view of the bush in FIG. 25.

The rigid axial column of the bush shank and the filling of the cross-section of the shank of the bush by the legs of the pin provide a fastener that strongly resists both vertical and horizontal (axial and transverse) detachment forces tending to separate assembled components. Each of the pin and bush is preferably manufactured as a unitary component by a plastic molding operation. The spacer 34 can be made of metal or strong plastic. To reduce the amount of material required for the manufacture of the flange of the bush, openings in the flange may be provided as indicated in FIGS. 12, 22, and 25.

While preferred embodiments of the invention have been shown and described, changes can be made without departing from the principles and spirit of the invention, the scope of which is defined in the following claims.

What is claimed is:

1. A fastener comprising:
   a pin having a head and a plurality of resilient legs depending from the head; and
   a bush having a flange and a shank depending from the flange,
      wherein the bush shank has a rigid axial column extending toward the flange from a tip region of the shank remote from the flange, and a plurality of projecting resilient pawls supported on the shank for movement inward and outward of the shank in slots, each pawl having a hinged end remote from the flange and having a shoulder at an opposite end, adjacent to the flange,
      wherein the pin and the bush are constructed so that the legs of the pin can be inserted through holes in the bush flange and into corresponding slots of the bush shank as the head of the pin is pressed toward the flange of the bush, and so that the legs flex resiliently as they are inserted into the respective slots,
   wherein the legs and the bush shank have cooperable parts that maintain the legs partially inserted in their respective slots at a temporary connection position, with the head of the pin spaced from the flange, and that maintain the legs fully inserted in the slots at a permanent connection position, with the head of the pin adjacent to the flange, and wherein the resilient pawls are free to move inwardly of respective slots at the temporary connection position, but are prevented from moving inwardly of the slots by the legs at the permanent connection position; and
      wherein the axial column has a cruciform cross-section, the slots are located at corner regions of the cruciform cross-section, and the cross-sections of the axial column and the legs substantially fill the cross-section of the bush shank at the permanent connection position.

2. The fastener according to claim 1, wherein the cooperable parts include protrusions on the legs and edge regions of the holes in the bush shank that are engaged by the protrusions.

3. The fastener according to claim 1, wherein the flange of the bush has a pair of spaced upright walls extending in a direction opposite to the bush shank and providing therebetween a space into which the pin is pressed.

4. The fastener according to claim 3, wherein the height of the walls is substantially the same as the height of the pin head above the flange when the pin is at the temporary connection position.

5. A fastener assembly comprising:
   a pin having a head and a plurality of resilient legs depending from the head; and
   a bush having a flange and a shank depending from the flange,
      wherein the bush shank has a rigid axial column extending toward the flange from a tip region of the shank remote from the flange, and a plurality of projecting resilient pawls supported on the shank for movement inward and outward of the shank in slots, each pawl having a hinged end remote from the flange and having a shoulder at an opposite end, adjacent to the flange,
      wherein the pin and the bush are constructed so that the legs of the pin can be inserted through holes in the bush flange and into corresponding slots of the bush shank as the head of the pin is pressed toward the flange of the bush, and so that the legs flex resiliently as they are inserted into the respective slots,
   wherein the legs and the bush shank have cooperable parts that maintain the legs partially inserted in their respective slots at a temporary connection position, with the head of the pin spaced from the flange, and that maintain the legs fully inserted in the slots at a permanent connection position, with the head of the pin adjacent to the flange, and
   wherein the resilient pawls are free to move inwardly of respective slots at the temporary connection position, but are prevented from moving inwardly of the slots by the legs at the permanent connection position, and
   wherein the axial column has a cruciform cross-section, the slots are located at corner regions of the cruciform cross-section, and the cross-sections of the axial column and the legs substantially fill the cross-section of the bush shank at the permanent connection position.

6. An assembly according to claim 5, wherein the cooperable parts of the fastener include protrusions on the legs and edge regions of the holes in the bush shank that are engaged by the protrusions.

7. An assembly according to claim 5, wherein the flange of the bush has a pair of spaced upright walls extending in a direction opposite to the shank and providing therebtween a space into which the pin is pressed.

8. An assembly according to claim 7, wherein the height of the walls is substantially the same as the height of the pin head above the flange when the pin is at the temporary connection position.

9. A fastener comprising:
   a pin; and
   a bush,
      wherein the pin and the bush are constructed so that the pin can be pushed into the bush to a temporary connection position and pushed farther into the bush to a permanent connection position,
      wherein the bush has a plurality of projecting resilient pawls on a bush shank depending from a bush flange, the pawls being adapted to engage edge regions of a hole in a workpiece into which the shank is inserted,
      wherein the pawls are free to move inwardly of the bush when the pin is at the temporary connection position but are prevented from moving inwardly of the bush when the pin is at the permanent connection position,
      wherein the bush flange has a pair of spaced walls extending in a direction opposite to a direction in which the shank extends from the flange, the height of the walls being correlated with the disposition of the pin at the temporary connection position to prevent the pin from being inadvertently moved from the temporary connection position, and
   wherein the shank has a rigid axial column that is cruciform in cross-section and the bush includes legs located at corner regions of the cruciform cross-section, and the cross-sections of the axial column and the legs substantially fill the cross-section of the bush shank at the permanent connection position.

* * * * *